United States Patent
Ren (10) Patent No.: US 6,929,397 B2
(45) Date of Patent: Aug. 16, 2005

(54) ARRANGEMENT FOR DETECTING TEMPERATURE VARIATIONS WITH ACCOMMODATION FOR RELATED SENSOR

(75) Inventor: Pietro Massimo Ren, Santa Giustina (IT)

(73) Assignee: Sipa S.P.A., Vittorio (IT)

( * ) Notice: Subject to any disclaimer, the term of this patent is extended or adjusted under 35 U.S.C. 154(b) by 0 days.

(21) Appl. No.: 10/470,194

(22) PCT Filed: Dec. 1, 2001

(86) PCT No.: PCT/EP01/14052

§ 371 (c)(1),
(2), (4) Date: Nov. 10, 2003

(87) PCT Pub. No.: WO02/058907

PCT Pub. Date: Aug. 1, 2002

(65) Prior Publication Data

US 2004/0066834 A1 Apr. 8, 2004

(30) Foreign Application Priority Data

Jan. 25, 2001 (IT) .................................. PN20010003 U (51) Int. Cl.[7] .................................................. G01K 1/14
(52) U.S. Cl. ..................... 374/208; 374/147; 374/150; 374/153; 73/866.5; 248/316.2; 24/20 R
(58) Field of Search .................. 277/319, 317, 277/641, 642, 644; 73/866.5; 248/316.2, 316.7, 229.11, 229.21; 24/20 R, 20 S, 22; 374/208, 147, 150, 153, 179, 194, 141, 163, 151; 136/221, 230; 425/144, 549

(56) References Cited

U.S. PATENT DOCUMENTS

| | | | | |
|---|---|---|---|---|
| 590,094 A | * | 9/1897 | Duncan ....................... 24/20 S |
| 1,263,925 A | * | 4/1918 | Polk ........................ 248/229.21 |
| 2,022,515 A | * | 11/1935 | Orchard ....................... 374/179 |
| 2,729,846 A | * | 1/1956 | Reed ........................... 24/20 R |
| 3,317,353 A | * | 5/1967 | Bingham ..................... 136/233 |
| 4,355,911 A | * | 10/1982 | Tymkewicz ................. 374/165 |
| 4,433,198 A | * | 2/1984 | Berner et al. ............... 136/230 |
| 4,964,795 A | * | 10/1990 | Tooman ....................... 425/144 |
| 5,009,718 A | * | 4/1991 | Schmidt ...................... 136/232 |
| 5,065,892 A | * | 11/1991 | Lukez ......................... 73/866.5 |
| 5,318,434 A | * | 6/1994 | Gellert ......................... 425/549 |
| 5,324,191 A | * | 6/1994 | Schmidt ...................... 425/549 |
| 5,405,258 A | * | 4/1995 | Babin .......................... 425/549 |
| 5,613,281 A | * | 3/1997 | Oetiker ......................... 24/20 R |
| 5,618,109 A | * | 4/1997 | Culbertson .................. 374/179 |
| 5,795,599 A | * | 8/1998 | Gellert ......................... 425/549 |
| 6,007,034 A | * | 12/1999 | Stoll et al. .................. 73/866.5 |
| 6,318,990 B1 | * | 11/2001 | Gellert et al. ............... 425/549 |
| 6,497,159 B1 | * | 12/2002 | Lavoie ....................... 73/866.5 |
| 6,546,823 B1 | * | 4/2003 | Veit ........................... 73/866.5 |

FOREIGN PATENT DOCUMENTS

DE 870481 5/1987
EP 0695617 2/1996

* cited by examiner

*Primary Examiner*—Gail Verbitsky
*Assistant Examiner*—Stanley J. Pruchnic, Jr.
(74) *Attorney, Agent, or Firm*—Wenderoth, Lind Ponack, L.L.P.

(57) ABSTRACT

Arrangement that supports a temperature sensor comprising a terminal probe, applied on the outside of a preferably cylindrical body, and comprising an elastic ring arranged in contact with said body and provided with a hole accommodating said terminal probe; the elastic ring is interrupted by a split-like gap that increases the elastic adaptation ability thereof. Preferably, on the outside of said ring there is provided a perimetrical groove and said hole is obtained by appropriately shaping of inner surfaces of said groove. On the inside of the ring there may be provided a through-slit, so that the groove is capable of being spread apart in correspondence of said hole.

12 Claims, 10 Drawing Sheets

FIG.6 SECTION B-B

FIG.5 VIEW FROM V

ARRANGEMENT FOR DETECTING TEMPERATURE VARIATIONS WITH ACCOMMODATION FOR RELATED SENSOR

BACKGROUND OF THE INVENTION

The present invention refers to a particular kind of arrangement for positioning a sensor in a removable manner in close vicinity of or in contact with a critical point or a critical zone of a cylindrical body, typically although not solely of metal, and in particular near an end portion of the body.

In an ideal manner, the above cited arrangement can be used in accommodating a removable thermocouple device for measuring the temperature of a nozzle for the injection of a flow of molten thermoplastic resin and, as a result, for indirectly measuring the temperature of the molten resin. For this reason, reference will be specifically made in the following description to such an application, although it shall be appreciated that the present invention may be used as well in all technical contexts and applications in which the need arises or is felt for the outside temperature of a cylindrical body to be measured, in accordance with the appended claims.

More specifically, the above cited nozzle is preferably used in machines for infection moulding thermoplastic resin, when a flow of such a resin in its molten, i.e. fluid state, flowing in either from appropriate conduits blown as "hot runners" in the art, and situated inside a related platen, or directly from the injector of the moulding machine, is injected towards and into a plurality of injection-moulding cavities defined by pairs of respective half-moulds.

The term "hot runner" is a term that is commonly used in the typical technical parlance in this particular field, so that the use thereof in this context will not give rise to any difficulty for those skilled in the art.

It is a widely used practice to make use of thermocouple devices for measuring in a continuous manner the temperature of a heated injection nozzle; in order to be able to monitor the temperature close to the gate of such a nozzle, it is important for the thermocouple itself to be positioned as close as possible to the front portion of the nozzle. Very crucial and decisive is also the capability for the position of the thermocouple to be exactly determined and firmly stabilized. As a result, the probe, i.e, the detecting head of the sensor device, must be mounted in a very accurate and secure manner, in particular during the installation and the maintenance of the nozzle in the injection mould.

This requirement must be peremptorily complied with each time that the nozzle is removed for any reason, and the need therefore appears quite clearly for technical solutions to be available, which would enable the thermocouple to be quickly removed and re-assembled while anyway ensuring a most accurate and constant positioning thereof.

Known from the disclosure in the U.S. Pat. No. 5,405,258 is the practice consisting in inserting the probe or measuring junction of a thermocouple in the injection nozzle used to inject a molten thermoplastic resin; such a probe, although it is capable of ensuring the temperature of the resin to be monitored in a most accurate manner, does however require the use of some supplementary devices; it furthermore is solely held in its position by the contrasting pressure existing between the nozzle itself and the frusto-conical portion of the platen containing the hot runners. This practically is the cause of a greater complexity in installing the thermocouple, as well as a quite likely instability in the positioning of the same thermocouple device.

According to the method described in the U.S. Pat. No. 5,028,227, the thermocouple is positioned in close vicinity of the nozzle by providing an appropriate inclined bore on the outside of the nozzle and most carefully and accurately inserting the thermocouple therein. However, since each time that the nozzles have to be replaced, the need arises for the thermocouple to be first removed and the reinstalled on the new nozzle, the necessary degree of accuracy implied in the process is the unavoidable cause of a much longer time required for the same process to be carried out, as well as a greater complexity thereof.

From the disclosure in the U.S. Pat. No. 4,875,848 the solution is known, which consists in using the frusto-conical end portion of the nozzle to provide a cross blind hole 138 therein, in which the thermocouple is then inserted and accommodated. However, in view of ensuring a due stability to the whole assembly, the nozzle itself, the heating element associated therewith and also the thermocouple must be secured to each other, preferably by brazing or soldering, and this of course implies, further to the complexity of such an additional process, also the unavoidable drawback that, when the nozzle must be replaced, the need also arises for the thermocouple to be either brazed again thereto or even replaced with a new one.

Known from the disclosure in the U.S. Pat. No. 5,795,599 is the practice consisting in applying the the, mocouple by drilling or, anyway, providing in the front portion of the nozzle a hole extending towards the rear portion thereof, inserting the thermocouple therein and bending the related lead wire backwards through a bend of half a round angle. Upon being so positioned on the nozzle, the thermocouple is stabilized, i.e. secured thereto through the application of an outer supplementary ring, which is provided with a plurality of appropriate appendices in a crown-like arrangement. After such a ring is duly applied so as to secure the thermocouple in its position, the appendices are bent by force so as to secure the ring, and therefore also the theruocouple, to the terminal portion of the nozzle. Such kind of solution can anyway be most readily appreciated to be characterized by its laboriousness during both the instailation and the removal of the thermocouple.

Known from the disclosure in the U.S. Pat. No. 5,326,251 is the practice consisting in arranging two distinct thermocouples in two respective positions in the final portion of the nozzle in view of more effectively controlling the course, i.e. pattern of the temperature gradient of the resin during the injection thereof into the mould. This actually proves particularly effective whenever plastic materials of different types and properties have to be processed. However, if this is not the case, the proposed solution appears to be unnecessarily complex.

Known from the disclosure in the U.S. Pat. No. 5,312,242 is, on the contrary, the practice consisting in providing a hollow tube acting as a sheath that surrounds and encloses the lead wire of the thermocouple for a certain length thereof. Such a sheath has actually the purpose of preventing possible resin leakages in the remaining parts of the mould from creeping along the thermocouple itself. This solution, however, does not involve any advantage as far as the techniques for installing and removing the thermocouple itself are concerned.

The U.S. Pat. No. 5,346,388 reveals a solution in which the thermocouple is accommodated in a manner that is similar to the one described in the afore mentioned U.S. Pat.

No. 5,795,599, but is locked in position according to what is exemplified in the afore mentioned U.S. Pat. No. 5,405,258. It of course also repeats the drawbacks associated with the patents.

OBJECTS OF THE INVENTION

Based on the above considerations, it is therefore a main purpose of the present invention, to provide an arrangement adapted to accommodate a removable temperature sensor for measuring the temperature of a cylindrical body, preferably made of metal, which is capable of overcoming and doing away with the drawbacks of the afore mentioned solutions, is capable of being easily installed and removed repeatedly, is low-cost and capable of being implemented using readily available techniques and materials.

Such an aim of the present invention, along with further features thereof, is reached in an arrangement that is made and operates as recited in the appended claims.

BRIEF DESCRIPTION OF THE DRAWINGS

The present invention may take the form of a preferred, although not sole embodiment such as the one that is described in detail and illustrated below by way of non-limiting example with reference to the accompanying drawings, in which.

DETAILED DESCRIPTION OF THE PREFERRED EMBODIMENTS

Figure 1:
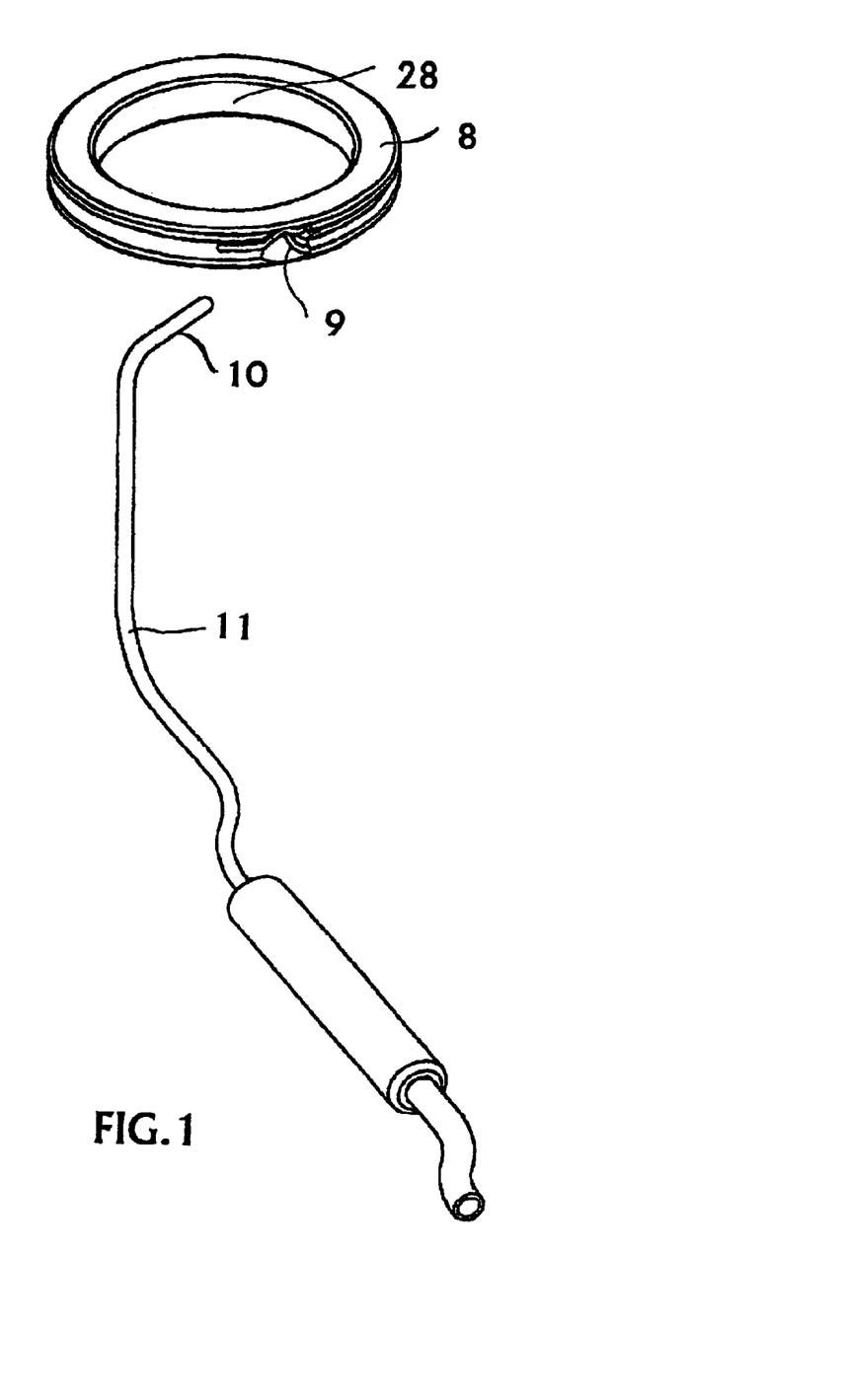
FIG. 1 is a simplified perspective view of a ring according to the present invention, along with the probe of a temperature sensor intended for application to the ring.

With reference to the above listed Figures, an arrangement according to the present invention comprises a ring 8, the main features of which are illustrated in FIGS. 1 through to 6. This ring 8 is provided, on its outer cylindrical surface, with a hole 9 adapted to accommodate the terminal probe 10 of a thermocouple device 11. Therefore, if using any of the largely known techniques, the ring 8 is applied on to the outside of the cylindrical surface of a body, the temperature of which has to be measured, an arrangement is in this way implemented which is adapted to support the terminal probe 10. As a result, the latter can be removably installed exactly in the desired position within the ring and, furthermore, the ring can in turn be arranged in the most favourable position in view of bringing the terminal probe into the most favourable position in relation to the zone whose temperature is to be measured.

In view of a greater extent of accuracy and rapidity in the response, the hole 9 may advantageously be carried out as a through-hole from the outer surface to the inner surface of the ring, so that the terminal probe 10 is capable of being pushed therethrough until it comes into direct contact with the outer surface of a hollow cylindrical body 1.

Figure 3:
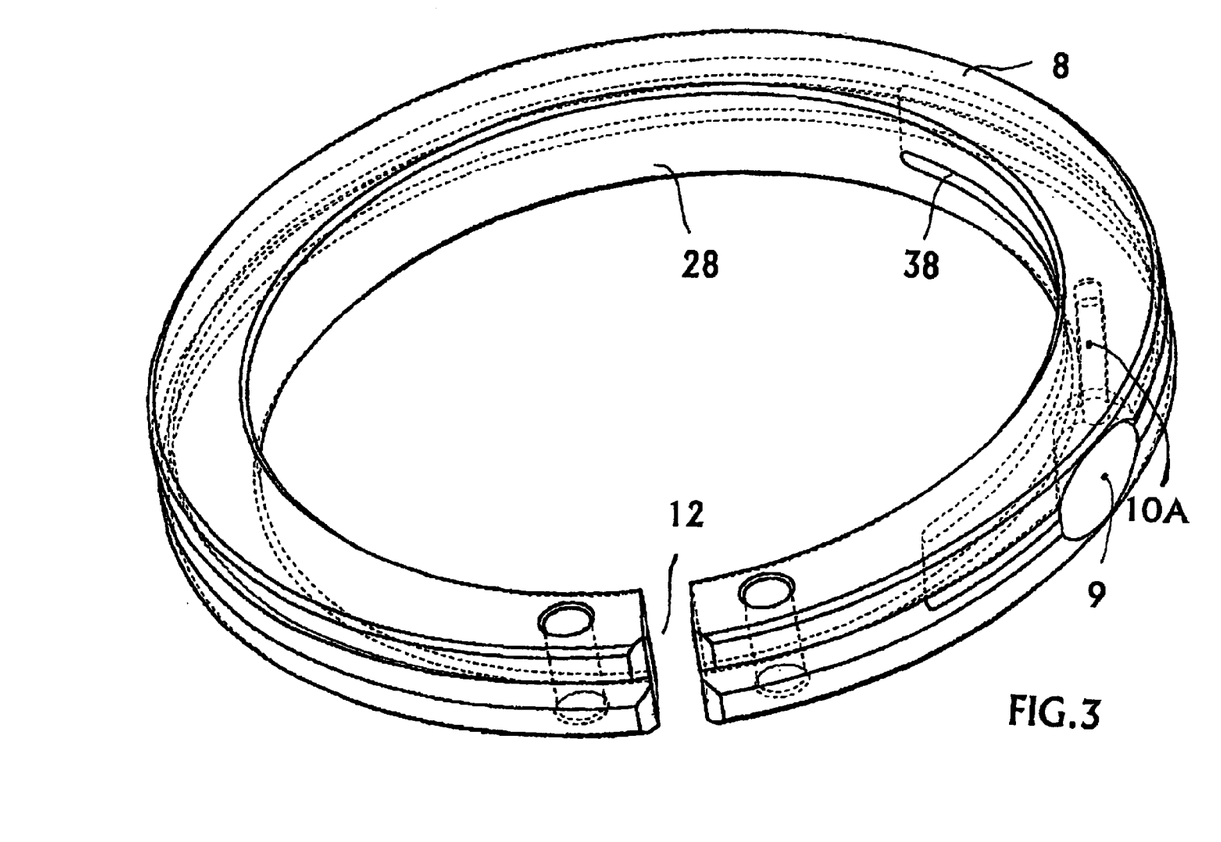
FIG. 3 is a different perspective view of the ring illustrated in FIG. 2.
Figure 4:
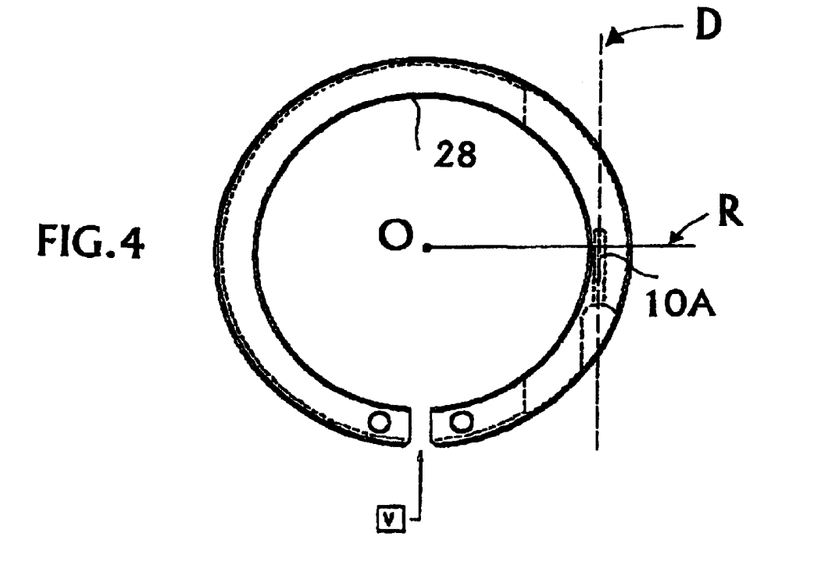
FIG. 4 is a plan view of the ring shown in the preceding Figures, as observed from a plane that is orthogonal to the axis of the same ring.
Figure 5:
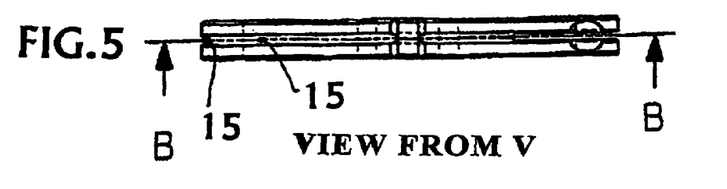
FIG. 5 is a side view of the ring illustrated in FIG. 4, as observed from the position "V" of FIG. 4.
Figure 6:
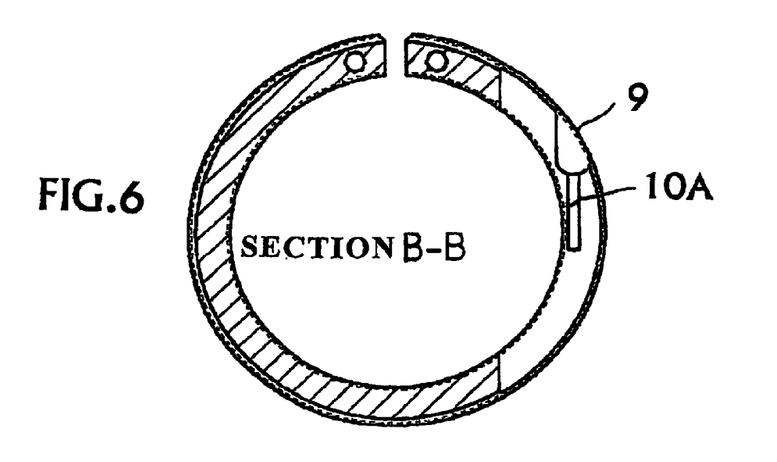
FIG. 6 is a median-section view of the ring illustrated in FIG. 5, as observed according to the respective section plane B—B.
Figures 7, 7A:
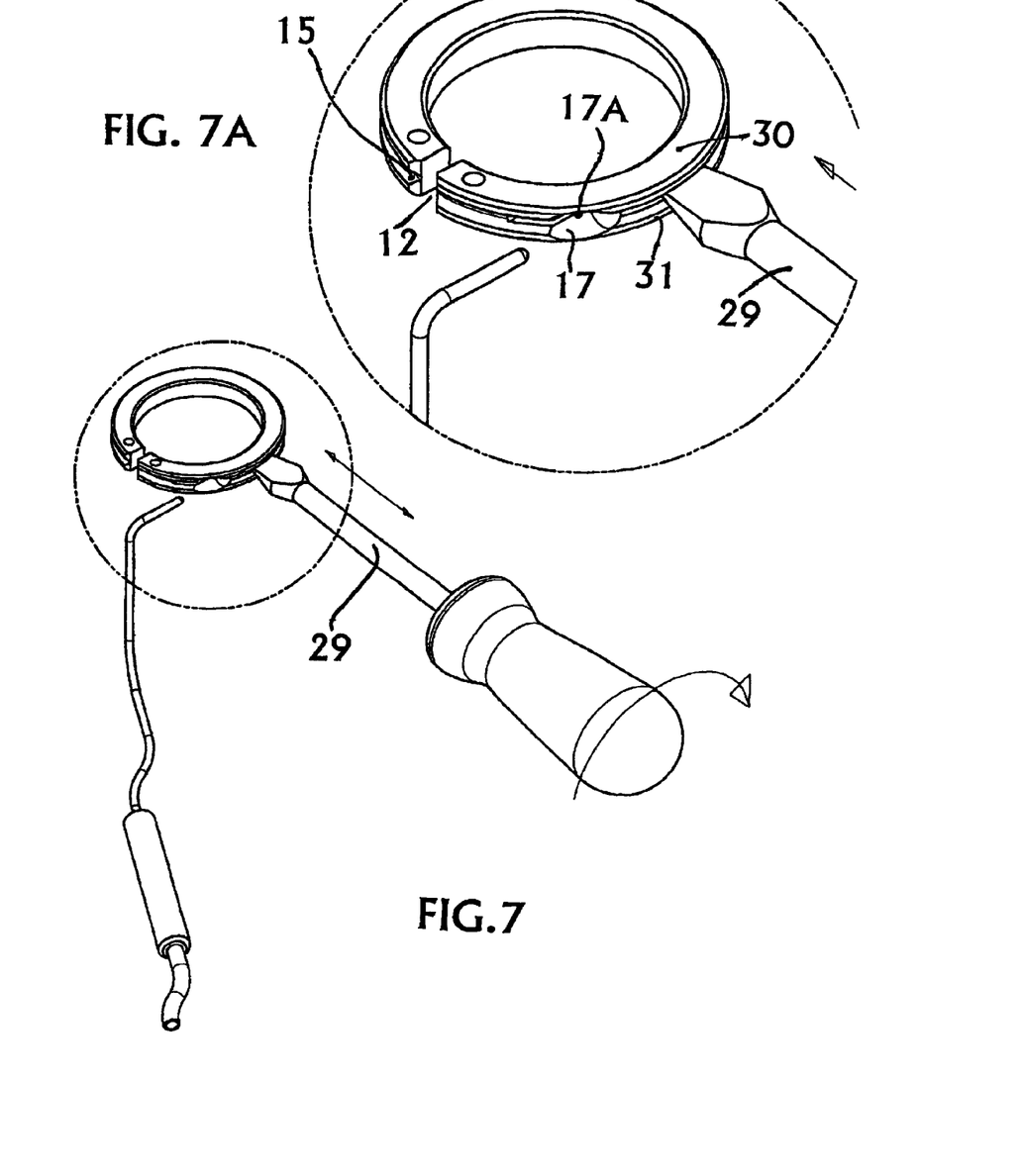
FIGS. 7 and 7a are a perspective view of a mode of utilization of an arrangement according to the present invention and an enlarged view thereof, respectively.
Figures 8, 8A:
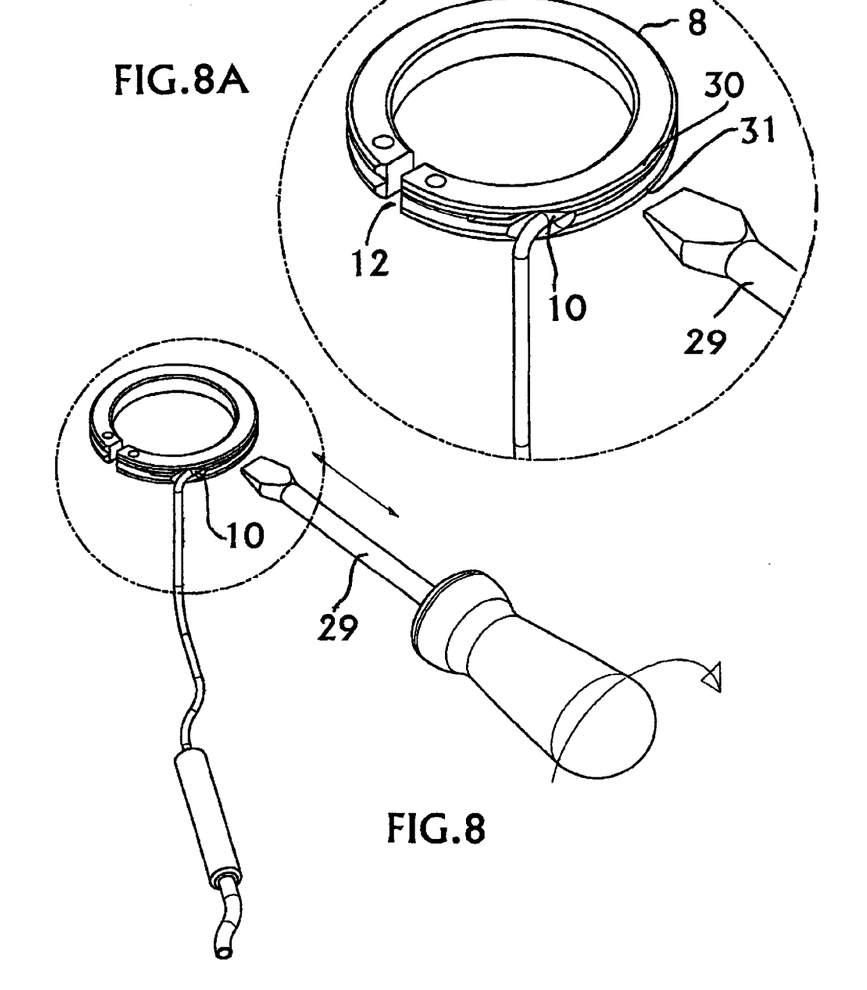
FIGS. 8 and 8a are perspective views of the arrangements illustrated in FIGS. 7 and 7a, respectively, in a subsequent phase of the mode of utilization and installation thereof.

On the other hand, if a temperature response is desired, which is less sensitive to the smallest variations, or if an improved locking-in-place of the probe in the ring is preferred, it proves advantageous, as illustrated in FIGS. 3, 4 and 6, for an inner portion 10A of the probe 10 not to protrude from the inner side of the ring; it should rather extend in a direction that is substantially tangential to the same ring, and preferably exceed the radius R extending from the axis O of the ring orthogonally to the tangential direction D of the inner portion 10A.

However, such a ring may present some difficulties in being applied over a cylindrical body 1, owing to clear limitations put to the elasticity of the material of the same ring. In order to overcome such a drawback, and to the purpose of enabling the ring to be quite easily put on and removed from the cylindrical body, a transversal slit 12 is provided in said ring to enable it to expand elastically (Seeger ring) so as to make it easier for it to be inserted on and removed from said cylindrical body.

However, a reliable locking-in place of the probe 10 of the thermocouple device in the ring may not be adequately ensured by the mere insertion of the probe in the hole 9. In view of doing away with such a drawback, the ring 8 is provided with an outwards open perimetrical groove 15 extending along the outer surface of the ring 8 at approximately half the height thereof, as this is best illustrate for instance in FIGS. 2, 5, 7A and 9.

According to this embodiment, the hole 9, in which the terminal probe 10 has to be inserted, becomes therefore obtainable, in the initial portion thereof, with two appropriate outlines 17, 17A of respective inner, mutually opposing faces of said perimetrical groove 15.

However, securing the probe 10 within the ring can even in this case present some difficulties.

Figure 2:
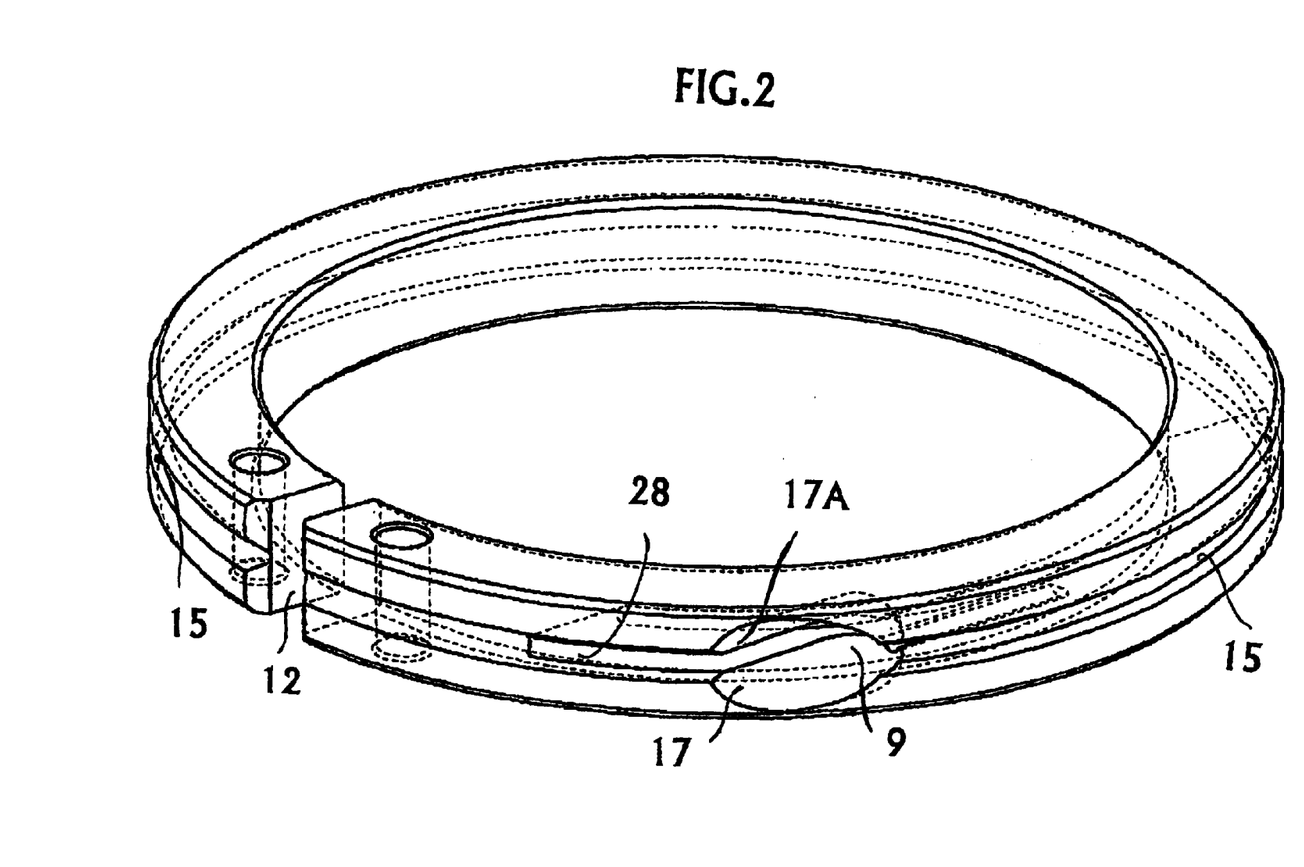
FIG. 2 is an enlarged view of a variant of the ring illustrated in FIG. 1.

In order to do away even with this problem, on the inner side 28 of the ring 8 there is advantageoliously provided at least a slit 38, as best illustrated in FIGS. 2 and 3, along a limited portion of the inner side. This slit must be provided in close vicinity of said hole 9 and must extend through the thickness of the ring, in the sense that it must join up with the portion of the groove on the opposite side of the ring 8.

The actual reasons behind such an improvement will be readily appreciated from the description given further on.

With reference to FIGS. 7, 7A, 8 and 8A, in order to insert the probe 10 in the hole 9 the need will only arise for the tip of a simple tool, for instance the tip of a screwdriver 29, to be inserted between lips 30, 31 formed by the opposite portions of the ring in the zone in which there is also provided one of the said slits 38. By exerting an appropriate force on the screwdriver against the ring, the blade of the same screwdriver 29 will succeed in elastically widening the lips 30, 31 apart and, as a result, widening also the aperture of the hole 9 in which the temperature probe 10 is then inserted. Upon such an insertion of the temperature probe, and with particular reference to FIGS. 8 and 8A, the screwdriver 29 is removed, thereby enabling the above cited lips to regain their resting, i.e. regular position by moving again close to each other and, ultimately, narrowing the aperture of said hole 9 and firmly tightening around the probe 10, which is already in its definitive position.

As hinted earlier in this description, a zither advantage can be obtained if, as illustrated in particular in FIGS. 4 and 6, the hole 9, as formed by the particular profiles 17, is oriented in a substantially tangential manner with respect to said ring 8. Such a circumstance, in fact, enables the length over which the terminal probe 10 is gripped and held firmly to be increased to a maximum extent and, as a result, enables the reliability and stability of the application to be maximized.

Figure 9:
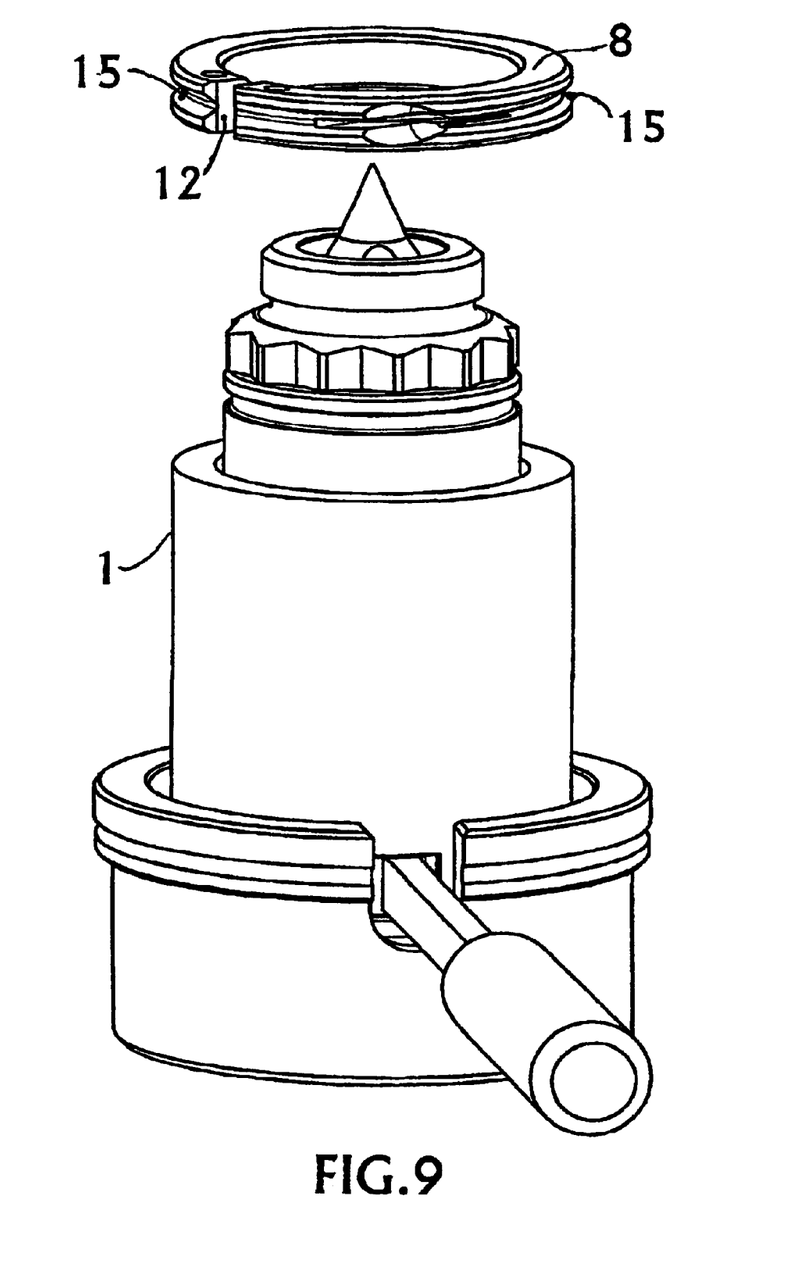
FIG. 9 is a view representing a preferred mode of application of the arrangement according to the present invention, on a nozzle for the injection of plastic resin.
Figure 10:
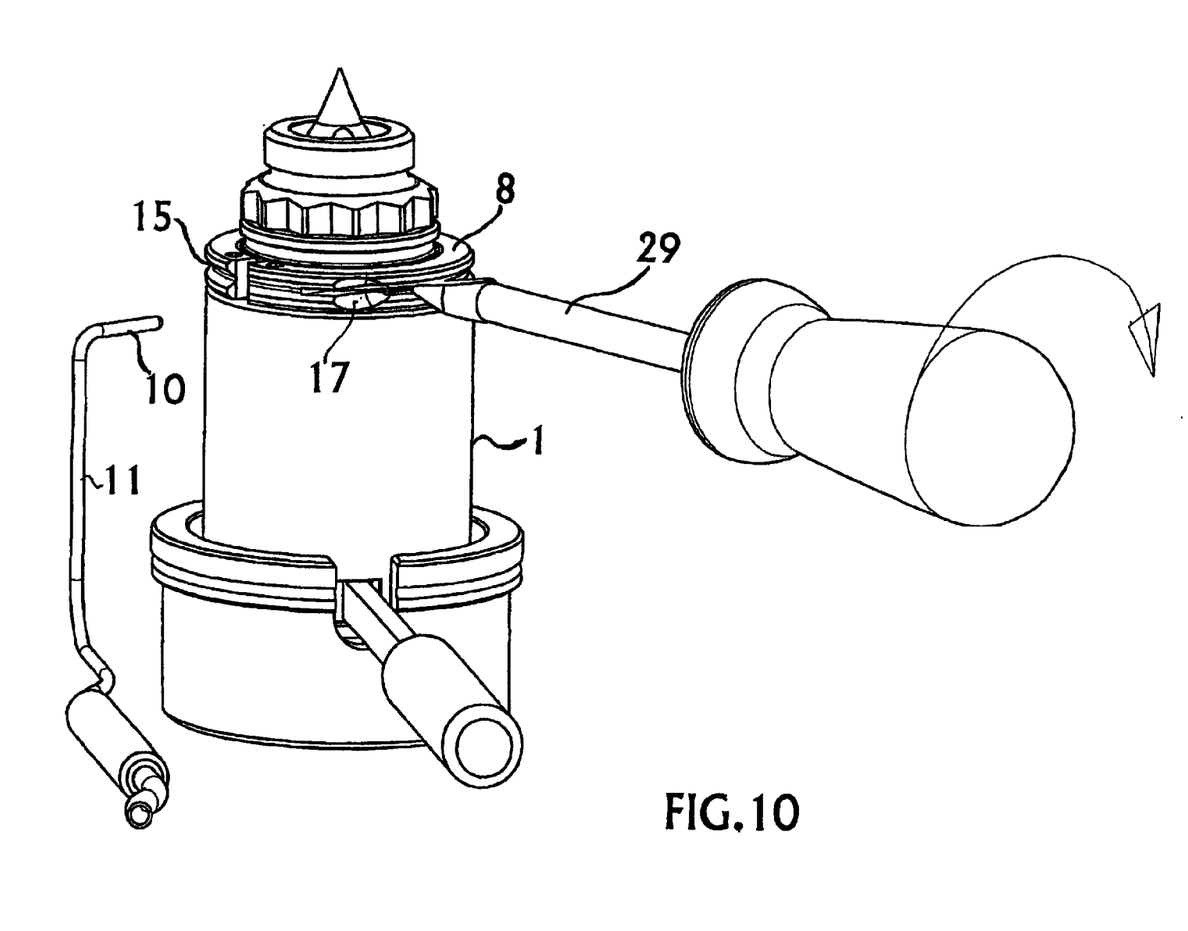
FIG. 10 is a view showing the arrangement of FIG. 9 in its assembled state on the body of the injection nozzle, with the temperature sensor so positioned as to be able to be itself associated to the ring.
Figure 11:
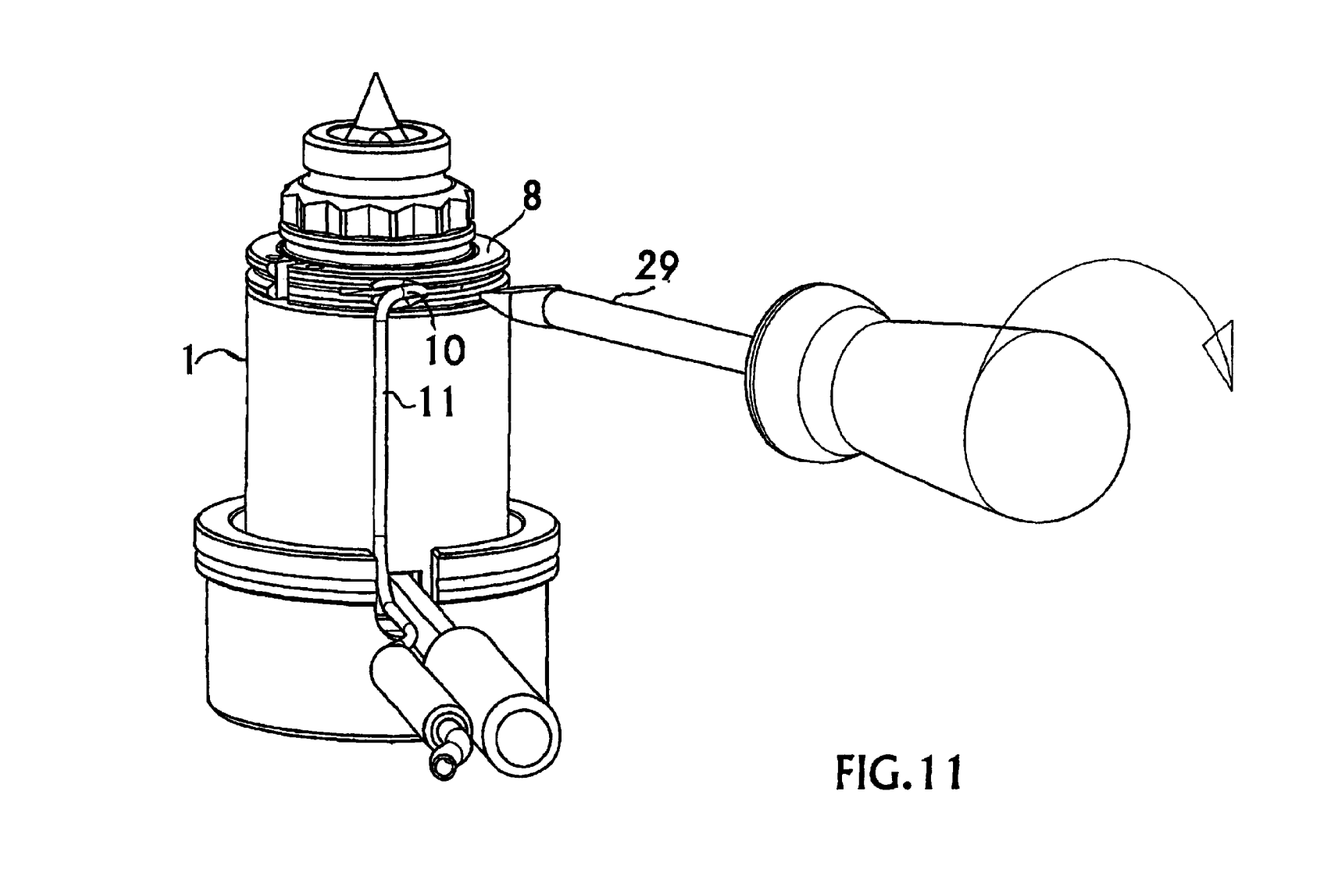
FIG. 11 is a view illustrating a subsequent phase of the installation of the arrangement according to the present invention, in the state in which it is at ready secured firmly on to the nozzle.

With reference to FIGS. 9, 10 and 11, these can be noticed to illustrate the three subsequent phases, in which a ring 8 according to the present invention and the afore described improvements thereof is installed on a cylindrical body 1, which is comprised in a nozzle for the injection of thermoplastic resin, in which the ring is widened apart so as to enable the probe 10 to be inserted therein, and in which the ring is then released into its resting position after the insertion of the probe.

Based on the explanations that have been already given above in this connection, and considering the particular clarity of the accompanying drawings, those skilled in the art will find no difficulty in figuring out the embodiment or development of other component parts or modalities that have not been described here in detail.

Figure 12:
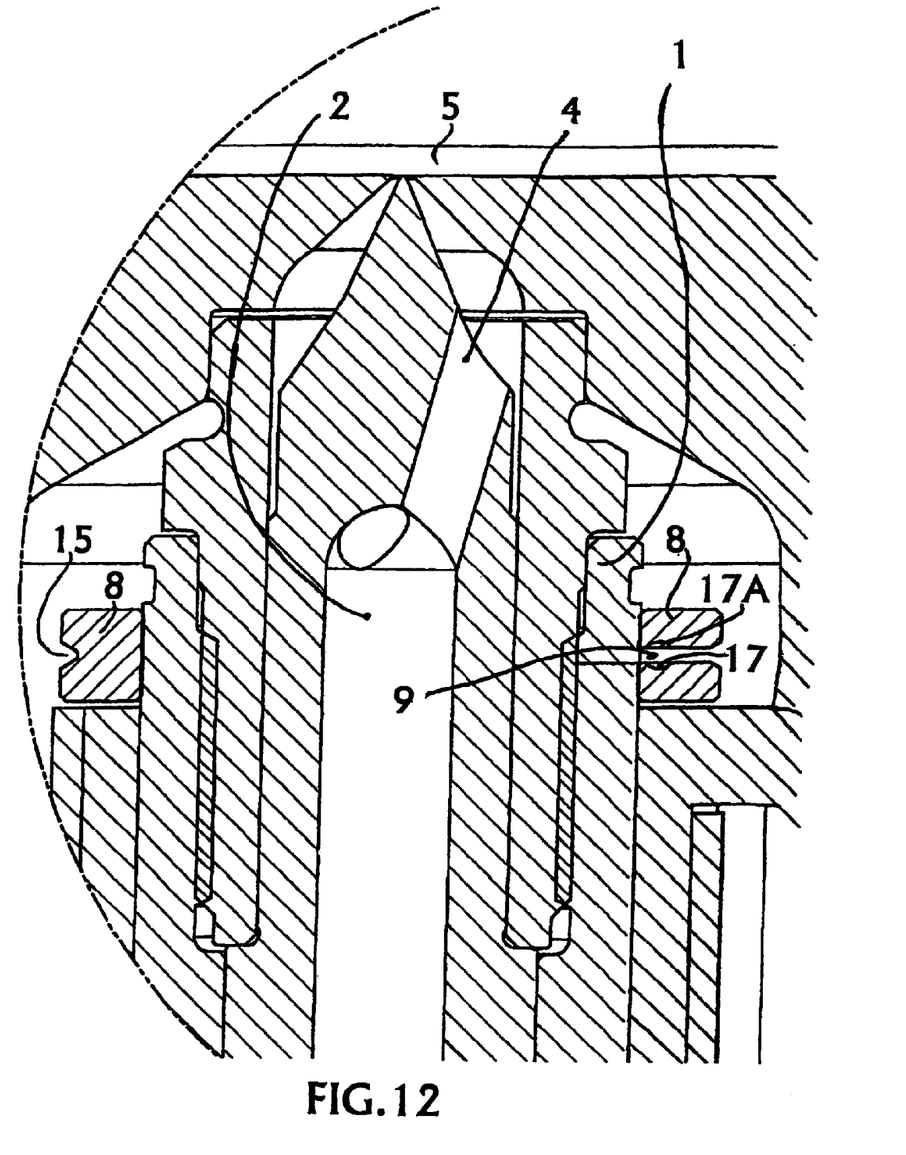
FIG. 12 is an enlarged view of a median axial section of the nozzle assembly of FIG. 11 using a ring according to the present invention.

Finally, with reference to FIG. 12, this can be noticed to illustrate an enlarged view of a portion of the axial median section of an injection nozzle comprising an inner through-cavity 2 that establishes a communication, via a rear access or inlet perforation (not shown) and a front outlet gate 4, between a hot runner (not shown) and a moulding cavity 5.

Clearly visible in this Figure is the hole 9 in the ring 8, in which the temperature probe has not been inserted yet, as well as the typical positioning of such a ring with respect to said injection nozzle.

What is claimed is:

1. An arrangement adapted to support a temperature sensor including a terminal probe on an outer surface of a cylindrical body, said arrangement comprising:

an elastic ring adapted to be installed in contact with the outer surface, said elastic ring having a hole adapted to accommodate the terminal probe;

a perimetrical groove situated on an outwardly oriented surface of said ring so that said ring has two mutually opposing lips;

wherein said hole is formed by contours of corresponding inner surfaces of said lips.

2. The arrangement of claim 1, wherein an inner side of said ring has a through-slit in correspondence with said hole so that said lips are capable of being widened apart in correspondence with said slit.

3. The arrangement of claim 2, wherein said hole is oriented so as to be substantially tangential to said ring.

4. The arrangement of claim 2, wherein said hole is a through-hole capable of allowing the terminal probe to be inserted there through until the probe contacts an outer surface of the cylindrical body.

5. The arrangement of claim 1, wherein said hole is oriented so as to be substantially tangential to said ring.

6. The arrangement of claim 1, wherein said hole is a through-hole capable of allowing the terminal probe to be inserted there through until the probe contacts an outer surface of the cylindrical body.

7. An arrangement adapted to support a temperature sensor including a terminal probe on an outer surface of a cylindrical body, said arrangement comprising:

an elastic ring adapted to be installed in contact with the outer surface, said elastic ring having a hole adapted to accommodate the terminal probe, and said elastic ring being made of a high-conductivity metal;

a slit in said elastic ring which increases the ability of said elastic ring to elastically widen and narrow;

a perimetrical groove situated on an outwardly oriented surface of said ring so that said ring has two mutually opposing lips;

wherein said hole is formed by contours of corresponding inner surfaces of said lips.

8. The arrangement of claim 7, wherein said slit is a through-slit in correspondence with said hole so that said lips are capable of being widened apart in correspondence with said slit.

9. The arrangement of claim 8, wherein said hole is oriented so as to be substantially tangential to said ring.

10. The arrangement of claim 8, wherein said hole is a through-hole capable of allowing the terminal probe to be inserted there through until the probe contacts an outer surface of the cylindrical body.

11. The arrangement of claim 7, wherein said hole is oriented so as to be substantially tangential to said ring.

12. The arrangement of claim 7, wherein said hole is a through-hole capable of allowing the terminal probe to be inserted there through until the probe contacts an outer surface of the cylindrical body.

* * * * *